United States Patent [19]

Schimmel et al.

[11] Patent Number: 4,457,848

[45] Date of Patent: Jul. 3, 1984

[54] PROCESS FOR AFTER-TREATING EXTRACTION RESIDUES ORIGINATING FROM THE DECONTAMINATION OF PHOSPHORIC ACID

[75] Inventors: Günther Schimmel, Erftstadt; Reinhard Gradl, Hürth; Gero Heymer, Erftstadt, all of Fed. Rep. of Germany

[73] Assignee: Hoechst Aktiengesellschaft, Fed. Rep. of Germany

[21] Appl. No.: 412,142

[22] Filed: Aug. 27, 1982

[30] Foreign Application Priority Data

Sep. 10, 1981 [DE] Fed. Rep. of Germany ....... 3135801

[51] Int. Cl.$^3$ .......................... C02F 1/52; C01B 25/26
[52] U.S. Cl. .................................. 210/724; 210/726; 210/906; 423/321 R; 423/321 R; 423/321 S; 423/166
[58] Field of Search ............... 210/724, 726, 906, 723, 210/710; 423/166, 158, DIG. 2, 305, 321 R, 321 S, 160

[56] References Cited

U.S. PATENT DOCUMENTS

| 4,256,716 | 3/1981 | Skidar ............................. 423/321 S |
| 4,279,876 | 7/1981 | Schrödter et al. .................. 423/305 |
| 4,285,921 | 8/1981 | Mamourian et al. ............ 423/321 S |
| 4,320,012 | 3/1982 | Palm et al. .......................... 210/724 |
| 4,374,810 | 2/1983 | O'Neill ............................... 210/726 |

FOREIGN PATENT DOCUMENTS 1467292  1/1969  Fed. Rep. of Germany ...... 423/166

*Primary Examiner*—Benoît Castel
*Attorney, Agent, or Firm*—Connolly and Hutz

[57] ABSTRACT

The disclosure relates to a process for after-treating extraction residues, termed raffinates, originating from the extractive decontamination of crude phosphoric acid. To this end, the disclosure provides for the raffinates to be converted to two separate solid matter fractions of differant chemical composition by admixing the raffinates with a calcium compound so as to establish a pH-value of 1.2 up to 2.5. Next, the resulting precipitate consisting essentially of gypsum is filtered off as a first solid matter fraction, and washed with water. The resulting filtrate and the wash water are made into a mixture and predetermined proportions of calcium compound are added so as to obtain, after complete reaction, a fully reacted filter cake with a pH-value of 9 up to 12, the resulting suspension being filtered off at a pH-value of 6 to 8. The filter cake consisting essentially of calcium phosphate is separated as the second solid matter fraction, and allowed to react completely.

5 Claims, No Drawings

PROCESS FOR AFTER-TREATING EXTRACTION RESIDUES ORIGINATING FROM THE DECONTAMINATION OF PHOSPHORIC ACID

The extractive decontamination of crude phosphoric acid by means of organic solvents, e.g. alcohols, ketones or ethers comprises converting the phosphoric acid in a multistage countercurrent apparatus into an organic extract phase, the phosphoric acid's inorganic contaminants, such as the ions of iron, aluminum, calcium, magnesium and minor proportions of heavy metals, such as cadmium, copper, zinc, nickel and chromium, being retained in the aqueous raffinate phase. The use of rather important quantities of sulfuric acid, which are added during the extraction in order to improve the yield, results in the raffinate containing—apart from cations—sulfuric acid and unreacted phosphoric acid as essential constituents, the $H_2SO_4$-content being incidentally distinctly higher than the $P_2O_5$-content (about 15 weight % $SO_4$; about 6 weight % $P_2O_5$; about 3 to 5 weight % cations; cf. European Patent Application No. 0 022 477).

This is material which cannot be delivered to the waste water for reasons of environmental protection so that it is necessary for it to be subjected to suitable after-treatment, its neutralization with lime producing a readily filterable alkaline suspension having turned out most suitable (cf. European Patent Application No. 0 017 741). The filter cake so obtained is compact and has an elution behaviour which complies with prescribed specifications, i.e. it can readily be disposed of and deposited.

The deposition product essentially consists of three substances or types of substances, namely gypsum ($CaSO_4.2H_2O$), calcium phosphates and a salt fraction comprised of metal hydroxides, phosphates and sulfates. In the event of the phosphoric acid extraction being effected under standard conditions, gypsum is obtained as the quantitatively dominating fraction among the three fractions just described.

As regards their deposition and value, the three fractions must be classified in different categories of materials. Gypsum can be said to be a widely non-pollutive useless substance, whilst calcium phosphates—unless duly deposited—are liable to increase the phosphate content in surface water; on the other hand, however, relatively high percentage phosphate is a rather valuable raw material for use in phosphate-processing operations.

The present invention now provides a process easy to carry out technically, wherein sulfuric acid and phosphoric acid-containing raffinate residue originating from the extractive decontamination of phosphoric acid is converted to two solid matter fractions of different chemical composition, of which one consists essentially of gypsum containing preferably not more than 5 weight % $P_2O_5$, the other containing the remaining raffinate constituents, especially $P_2O_5$, and a minimum of sulfate.

To this end, the invention unexpectedly provides:
(a) for the water-containing acid raffinates to be admixed with a calcium compound producing an alkaline reaction so as to establish a pH-value of 1.2 up to 2.5; preferably 1.4 up to 2.0;
(b) for resulting precipitate consisting essentially of gypsum, to be filtered off as a first solid matter fraction, and to be washed with water;
(c) for the resulting filtrate and wash water to be made into a mixture, for the latter to be admixed with predetermined proportions of calcium compound so as to obtain, after complete reaction, a fully reacted filter cake with a pH-value of 9 up to 12, determined on a 10% weight % aqueous suspension, and for resulting suspension to be filtered upon establishment of a pH-value of 6 to 8; and
(d) for the filter cake consisting essentially of calcium phosphate to be separated as the second solid matter fraction, and allowed to react completely.

It is preferable for the first solid matter fraction to be filtered off at least 2 hours, advantageously 4 to 6 hours, after complete reaction with agitation. This in the interest of obtaining coarsely crystalline gypsum easy to filter and dehydrate. The quantity of calcium added and the pH-value which is associated with such addition depend on the molar ratio of $SO_4:P_2O_5$ initially present in the raffinate; based on sulfate, less than stoichiometric proportions are added.

The precipitate filtered off during operational step (b) should preferably be suspended in water and washed, at elevated temperature of about 50° up to 70° C., with water for as long as necessary to have less than 5 weight % $P_2O_5$ in the dry substance. The water should preferably be used in quantities equal to 50% up to 200% the weight of the filter cake.

Depending on the composition of the starting raffinate, the gypsum so washed contains as little as 2 to 4 weight % $P_2O_5$, and can certainly be said to be a non-pollutive deposition product.

As to the precipitated second solid matter fraction comprised of phosphate and heavy metals, it is necessary in preliminary tests to determine the quantity of calcium needed for establishment of a pH-value of 9 to 12, determined on a 10 weight % aqueous suspension, in the fully reacted filter cake.

The filter cake which is being formed during the second precipitation stage consists essentially of calcium phosphate and further metal hydroxides, phosphates and sulfates. If desired, it can be separated into still further solid matter fractions. The second solid matter fraction contains $P_2O_5$ in proportions as high as about 15 up to 25 weight % and sulfate in proportions as low as about 2-4 weight % so that, despite the high metal content therein, it is possible for it to be used as phosphate raw material in a phosphorus furnace, or as a fertilizer.

Quicklime (CaO), lime hydrate ($Ca(OH)_2$) or more preferably granulated phosphorus furnace slag which essentially consists of calcium metasilicate can successfully be used as agents for precipitating gypsum. By the use of phosphorus furnace slag, the filtration efficiency is actually impaired to some minor extent; at the same time, however, the gypsum becomes more completely dehydrated and the $P_2O_5$ is easier to extract from the filter cake. In the phosphate precipitation stage, use should preferably be made of CaO or $Ca(OH)_2$ in the interest of an improved filterability and in the interest of the high pH-value desired to be established.

The accurate control (a) of the pH-value during the sulfate precipitation stage and (b) of the reaction time would not have been expected to permit raffinate originating from the extractive decontamination of phosphoric acid to be separated into a gypsum fraction containing but very little $P_2O_5$ and a calcium phosphate fraction containing very little sulfate. The addition of calcium in stoichiometric proportions, based on sulfate, produces unsatisfactory separation results and is additionally difficult to achieve technically. Reaction periods too short also produce poor separation results.

A further technically beneficial effect resides in the good filterability of the materials obtained in the two treatment stages, the filtration especially in the phosphate precipitation stage producing satisfactory results without the need to use special equipment. An important requirement provides, however, for the filtration to be effected prior to the end of the neutralization reaction.

The following Examples illustrate the invention which is naturally not limited thereto. Details pertaining to Examples 1 to 6 are given in the Table hereinafter. The separating factors S are an index of the separation efficiency and defined as follows:

$$S = \frac{(g\ SO_4)}{g\ P_2O_5} \text{ in gypsum} \cdot \frac{(g\ P_2O_5)}{g\ SO_4} \text{ in phosphate}$$

EXAMPLE 1 (COMPARATIVE EXAMPLE)

400 g raffinate originating from the extractive decontamination of Morocco crude phosphoric acid with amyl alcohol (7.3 weight % $P_2O_5$; 9.8 weight % $SO_4$; 0.03 weight % Ca) was placed in a beaker and admixed at 80° C. with agitation with 18.0 g CaO (84 weight % strength), the resulting suspension having a pH-value of 1. Next, the whole was stirred for 5 hours. Filtration with the use of a suction filter gave 347 g filtrate, which was stored, and 65 g filter cake.

The cake was stirred for 1 hour at 70° C. with 98 g water and the resulting suspension was filtered while hot, 100 g filtrate, which was stored, and 63 g colorless compact filter cake was obtained. After drying at 80° C., it weighed 44.0 g and contained 3.1 weight % $P_2O_5$ and 53.8 weight % $SO_4$.

The two filtrates were combined and neutralized at 70° C. with 63 g CaO and filtered at once by means of a suction filter. The suspension had a pH-value of 7.6 and the fully reacted filter cake (in the form of a 10 weight % suspension) had a pH-value of 9.5. 224 g filtrate and 280 g compact filter cake were obtained. After drying at 80° C., the filter cake weighed 108 g and contained 26.2 weight % $P_2O_5$ and 15.0 weight % $SO_4$; the separating factor S was 30.4.

EXAMPLE 2 (INVENTION)

The procedure was as in Example 1 but 25.6 g CaO was used for effecting the precipitation of the gypsum so that the resulting suspension had a pH-value of 1.5. The dried gypsum contained 3.8 weight % $P_2O_5$ and the phosphate filter cake contained 2.0 weight % $SO_4$; the separating factor S was 159.5.

EXAMPLE 3 (INVENTION)

The procedure was as in Example 2 but the quicklime was replaced by granulated phosphorus furnace slag (calcium metasilicate containing 49.2 weight % CaO and 43.0 weight % $SiO_2$). A pH-value of 1.5 was established in the gypsum suspension. The dried mixture of gypsum and $SiO_2$ contained 3.2 weight % $P_2O_5$. In the second precipitation stage, CaO was used as the neutralizing agent and the resulting material was filtered at once. The dried filter cake contained 1.8 weight % $SO_4$; the separation factor S was 140.3.

EXAMPLE 4 (COMPARATIVE EXAMPLE)

The procedure was as in Examples 1 to 3 but raffinate containing 6.3 weight % $P_2O_5$ and 20.1 weight % $SO_4$ was used. Neutralization was effected with the use of CaO so as to establish a pH-value of 2.2 and the whole was stirred for 2 hours at 80° C. The dried salt contained 6.5 weight % $P_2O_5$ and the separating factor S was 41.3.

EXAMPLE 5 (COMPARATIVE EXAMPLE)

The procedure was as in Example 4 but the neutralization was effected with CaO to establish a pH-value of only 0.6 and the whole was stirred at 80° C. for 5 hours. The filtrate obtained in the gypsum precipitation stage still contained 4.1 weight % $SO_4$. This was consistent with the low 3.6 weight % $P_2O_5$-content in the dried gypsum; the dried phosphate filter cake however contained sulfate in a proportion as high as 8.7 weight %; as a result, the separating factor S was as low as 28.7.

EXAMPLE 6 (INVENTION)

The procedure was as in Example 5 but the neutralization was effected with the use of CaO so as to establish a pH-value of 1.8. The separation efficiency was good and the two fractions precipitated were of satisfactory purity. The gypsum contained 3.2 weight % $P_2O_5$ and the phosphate filter cake contained 2.5 weight % $SO_4$; the separating factor S was 132.8.

| | Precipitation of gypsum | | | Cake wash | | | Gypsum dry | | |
|---|---|---|---|---|---|---|---|---|---|
| | Quantity | | Quantity in g | | Quantity in g | | Quantity | | |
| Ex. | CaO (84%) | pH | filtrate | cake | $H_2O$ | filtrate | cake | in g | % $P_2O_5$ | % $SO_4$ |
| 1 | 18.0 | 1.0 | 347 | 65 | 98 | 100 | 63 | 44 | 3.1 | 53.8 |
| 2 | 25.6 | 1.5 | 228 | 192 | 192 | 210 | 170 | 71 | 3.8 | 52.5 |
| 3 | 46.1* | 1.5 | 282 | 158 | 158 | 170 | 144 | 86 | 3.2 | 42.3 |
| 4 | 58.8 | 2.2 | 143 | 312 | 312 | 314 | 297 | 161 | 6.5 | 48.2 |
| 5 | 49.0 | 0.6 | 142 | 295 | 295 | 306 | 276 | 152 | 3.6 | 47.3 |
| 6 | 53.6 | 1.8 | 230 | 222 | 333 | 330 | 223 | 137 | 3.2 | 56.8 |

*with phosphorus furnace slag

| Phosphate precipitation | | | | | | | |
|---|---|---|---|---|---|---|---|
| Quantity | pH | | Quantity in g | | Phosphate cake dry | | |
| CaO | suspension | cake | filtrate | cake | quantity in g | % $P_2O_5$ | % $SO_4$ | S |
| 63.0 | 7.6 | 9.5 | 224 | 280 | 108 | 26.2 | 15.0 | 30.4 |
| 62.0 | 8.0 | 9.4 | 212 | 284 | 114 | 23.1 | 2.0 | 159.5 |
| 81.0 | 8.5 | 11.6 | 158 | 376 | 141 | 19.1 | 1.8 | 140.3 |
| 60.0 | 8.0 | 11.4 | 306 | 204 | 95 | 15.6 | 2.8 | 41.3 |
| 55.0 | 8.0 | 11.4 | 289 | 211 | 105 | 19.0 | 8.7 | 28.7 |
| 57.0 | 7.9 | 11.3 | 390 | 223 | 110 | 18.7 | 2.5 | 132.8 |

We claim:
1. Process for after-treating sulfuric acid extraction residues, termed raffinates, originating from the extrac- tive decontamination of crude phosphoric acid with the aid of organic solvents in the presence of sulfuric acid, by reacting these raffinates with calcium compounds producing an alkaline reaction which comprises: converting the raffinates into two separate solid matter fractions of different chemical composition by effecting the following operational steps:

(a) admixing the water-containing raffinates with the calcium compound so as to establish a pH-value of 1.2 up to 2.5;

(b) filtering off, as a first solid matter fraction, the resulting precipitate consisting essentially of gypsum, and washing it with water;

(c) making the resulting filtrate and wash water into a mixture, admixing the latter with predetermined proportions of calcium compound so as to obtain, after complete reaction, a fully reacted filter cake with a pH-value of 9 up to 12, determined on a 10 weight % aqueous suspension, and filtering the resulting suspension upon establishment of a pH-value of 6 to 8; and (d) separating, as the second solid matter fraction, the filter cake consisting essentially of calcium phosphate, and allowing it to react completely.

2. Process as claimed in claim 1, wherein a pH-value of 1.4 up to 2.0 is established during operational step (a).

3. Process as claimed in claim 1, wherein the first solid matter fraction is filtered off after a period of at least 2 hours.

4. Process as claimed in claim 3, wherein the first solid matter fraction is filtered off after a period of 4 up to 6 hours.

5. Process as claimed in claim 1, wherein the precipitate filtered off in operational step (b) is suspended in water and washed for as long as necessary to have less than 5 weight % $P_2O_5$ in the dry substance.

* * * * *